(12) United States Patent
Miller

(10) Patent No.: US 12,171,629 B2
(45) Date of Patent: *Dec. 24, 2024

(54) METHOD OF MANUFACTURING A DENTAL COMPONENT

(71) Applicant: DEKEMA DENTAL-KERAMIKÖFEN GMBH, Freilassing (DE)

(72) Inventor: Stephan Miller, Traunstein (DE)

(73) Assignee: DEKEMA DENTAL-KERAMIKÖFEN GMBH, Freilassing (DE)

( * ) Notice: Subject to any disclaimer, the term of this patent is extended or adjusted under 35 U.S.C. 154(b) by 750 days.

This patent is subject to a terminal disclaimer.

(21) Appl. No.: 17/265,508

(22) PCT Filed: Jul. 9, 2019

(86) PCT No.: PCT/EP2019/068314
§ 371 (c)(1),
(2) Date: Feb. 2, 2021

(87) PCT Pub. No.: WO2020/030359
PCT Pub. Date: Feb. 13, 2020

(65) Prior Publication Data
US 2021/0290352 A1 Sep. 23, 2021

(30) Foreign Application Priority Data
Aug. 6, 2018 (DE) ..................... 10 2018 119 079.4

(51) Int. Cl.
*A61C 13/34* (2006.01)
*A61C 9/00* (2006.01)
*A61C 13/00* (2006.01)
*A61C 13/20* (2006.01)
*B29C 33/38* (2006.01)
*B29C 33/44* (2006.01)
*B29C 64/393* (2017.01)
(Continued)

(52) U.S. Cl.
CPC ............ *A61C 13/34* (2013.01); *A61C 9/0053* (2013.01); *A61C 13/0004* (2013.01);
(Continued)

(58) Field of Classification Search
CPC ................................ B29C 64/00; B33Y 10/00
See application file for complete search history.

(56) References Cited

U.S. PATENT DOCUMENTS

| 7,092,780 B2 * | 8/2006 | Ganley | A61C 13/081 700/98 |
| 8,352,060 B2 * | 1/2013 | Chun | A61C 13/0004 700/98 |

(Continued)

FOREIGN PATENT DOCUMENTS

| DE | 10037981 B4 | 8/2007 |
| DE | 102006056451 A1 | 6/2008 |

(Continued)

OTHER PUBLICATIONS

German Patent Office Search Report mailed Feb. 21, 2019 for German Patent Application No. 102018119079.4, 2 pages.

(Continued)

*Primary Examiner* — Atul P. Khare
(74) *Attorney, Agent, or Firm* — Dickinson Wright PLLC

(57) ABSTRACT

The present invention relates to a method of manufacturing a dental component, in particular a dental prosthesis or a partial dental prosthesis, by means of a dental furnace, comprising the following steps:
(i) additively manufacturing, in particular by means of 3D printing, a model of the dental component from a model material on the basis of a virtual 3D model of the dental component;
(ii) embedding the model in an investment material;
(iii) removing the model from the investment material, in particular by heating or burning out, to obtain a negative mold of the model;

(Continued)

Figure 1:
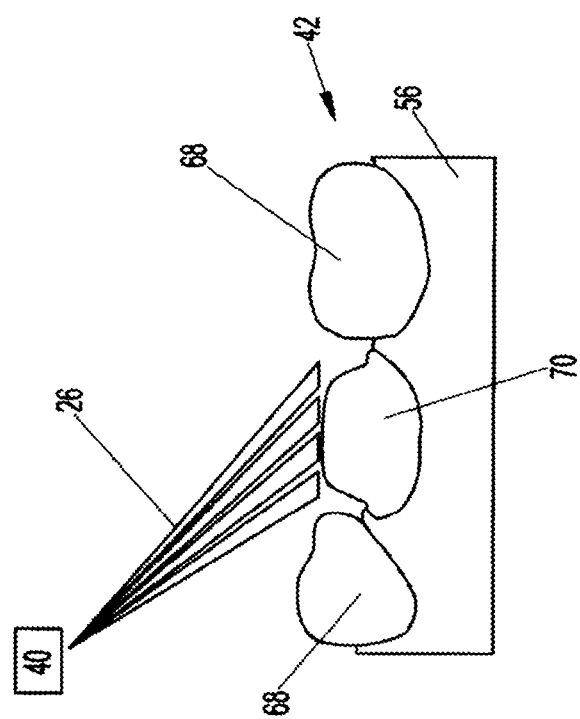

(iv) inserting a raw material required for manufacturing the dental component into the negative mold;
(v) producing the dental component in the negative mold; and
(vi) removing the negative mold.

14 Claims, 11 Drawing Sheets

(51) Int. Cl.
    *B33Y 50/02*     (2015.01)
    *B33Y 80/00*     (2015.01)
    *F27B 17/02*     (2006.01)
    *B29L 31/00*     (2006.01)

(52) U.S. Cl.
    CPC .......... *A61C 13/20* (2013.01); *B29C 33/3835* (2013.01); *B29C 33/3842* (2013.01); *B29C 33/3892* (2013.01); *B29C 33/448* (2013.01); *B29C 64/393* (2017.08); *B33Y 50/02* (2014.12); *B33Y 80/00* (2014.12); *F27B 17/025* (2013.01); *B29L 2031/753* (2013.01)

(56) References Cited

U.S. PATENT DOCUMENTS

| | | | | |
|---|---|---|---|---|
| 8,636,512 | B2* | 1/2014 | Dierkes | B33Y 70/00 433/201.1 |
| 9,603,683 | B2* | 3/2017 | Dierkes | A61C 5/77 |
| 2003/0198912 | A1* | 10/2003 | Mah | A61C 7/08 433/5 |
| 2006/0261503 | A1* | 11/2006 | Sago | A61C 13/081 264/16 |
| 2009/0026643 | A1* | 1/2009 | Wiest | A61C 5/77 264/16 |
| 2014/0377718 | A1* | 12/2014 | Korten | A61C 13/0022 264/16 |
| 2016/0184062 | A1* | 6/2016 | Jussel | A61C 5/77 264/16 |
| 2018/0171052 | A1 | 6/2018 | Bonderer | |
| 2021/0317297 | A1* | 10/2021 | Jena | A61C 13/34 |

FOREIGN PATENT DOCUMENTS

| | | | | |
|---|---|---|---|---|
| DE | 102010064142 | A1 | | 6/2012 |
| DE | 102016225208 | A1 | | 6/2018 |
| EP | 2082703 | A2 | | 7/2009 |
| JP | 2011167726 | A | * | 9/2011 |
| WO | 2007/060142 | A1 | | 5/2007 |
| WO | WO-2008103024 | A1 | * | 8/2008 ......... A61C 13/0004 |
| WO | 2018/038954 | A1 | | 3/2018 |

OTHER PUBLICATIONS

International Search Report and Written Opinion, with an English translation, mailed Dec. 3, 2019 for International Application No. PCT/EP2019/068314, 26 pages.

* cited by examiner

METHOD OF MANUFACTURING A DENTAL COMPONENT

CROSS-REFERENCE TO RELATED APPLICATIONS

This application is a 371 National Phase Application of Patent Application PCT/EP2019/068314, filed on Jul. 9, 2019, which claims the priority of German Application No. 102018119079.4 filed on Aug. 6, 2018, each of which is incorporated herein by reference, in its entirety.

The present invention relates to a method of manufacturing at least one dental component, in particular a dental prosthesis or a partial dental prosthesis.

Methods of manufacturing dental components are generally known and usually comprise a plurality of complex individual steps that are performed manually for the most part. In a first step, a dental impression of the respective patient is prepared. The model for the dental component to be produced can subsequently be produced with the aid of this dental impression. For this purpose, the model is, for example, molded by hand using a—still unprocessed—wax blank. The wax blank can be characterized by a size adapted to the dental impression, wherein the wax blank is also processed in a complex manner and is individually adapted to the dentition of the patient. However, it is also possible to select an already molded wax blank—at least approximately suitable for the conditions present with the impression—that only has to be modified slightly or not at all. The finished model of the dental component is subsequently positioned by hand on a base body, a so-called column, to produce a so-called abutment. The column is composed of a material that has similar properties to the material of the model at least with respect to the melting behavior. The model is embedded together with the column in an investment material. As soon as the investment material has been cured, the model and the column are burnt out of the investment material.

For this purpose, the cured investment material is positioned in a furnace such that the melted model material can flow out of the investment material. The result of the process is a negative mold of the model and of the column—that is of the abutment—in the investment material.

The negative mold is subsequently filled with a raw material of which the dental component is to be composed. The raw material is present in pellet form, for example. It is inserted into the channel of the negative mold formed by the column.

The raw material is melted within the negative mold by a suitable process and using a corresponding apparatus and is—at least temporarily—acted on by a pressing force. After the curing of the component, the negative mold subsequently has to be removed carefully and usually in a very complex manner to expose the finished dental component in an undamaged manner.

The production of the dental component is thus associated with a very high work effort. In addition, due to the large number of required individual steps for producing the dental component, defects can occur at many points and defects can be carried away.

It is therefore an object of the present invention to provide a method of manufacturing a dental component and a corresponding system that is characterized by a lower work effort. In addition, the possible error sources should be minimized.

The method comprises the following steps:
(i) additively manufacturing, in particular by means of 3D printing, a model of the dental component from a model material on the basis of a virtual 3D model of the dental component;
(ii) embedding the model in an investment material;
(iii) removing the model from the investment material, in particular by heating or burning out, to obtain a negative mold of the model;
(iv) inserting a raw material required for manufacturing the dental component into the negative mold;
(v) producing the dental component in the negative mold; and
(vi) removing the negative mold.

Therefore, the method in accordance with the invention is characterized in that a physical model is produced on the basis of a virtual model by means of an additive manufacturing process.

For the manufacture of a dental component, a physical model is—as already mentioned—required on the basis of which a negative mold of the desired dental component is prepared. A suitable manufacturing process for the physical model is e.g. stereolithography (e.g. laser microstereolithography). The model material is then in particular a light-curing plastic that is initially present in the form of liquid base monomers. Local photopolymerization events are effected layer by layer by means of laser beams and together produce the desired structure. However, other 3D printing processes can also be used.

The process can be at least partly automated by additive manufacturing. Human errors in the processing of the model are hereby reduced. In addition, fine details in the structure of the dental component can be produced in a reproducible manner with the aid of additive manufacturing, which is only possible to a limited extent in a production of the model by hand.

In addition, considerable costs can be saved by producing the physical model by means of additive manufacturing, or 3D printing, since, on the one hand, no storage or holding costs for model blanks are incurred and, on the other hand, material costs can be saved since additive manufacturing—as the name already suggests—is a build-up process and excess material therefore does not have to be removed and disposed of by means of a stripping process, as is the case with a reworking of a model blank.

Since additive manufacturing processes are now comparatively inexpensive, not only the physical model, but also auxiliary structures, such as structural elements that support the models and/or base plates on which the models are placed for the embedding, can be printed. It is possible to print the individual components separately or together—that is in one piece. In the case of a separate production, the components must be connected to one another. Mechanical codings and/or markings, which are preferably produced on the printing of the components, facilitate a positionally accurate joining together of the individual parts.

The model produced is embedded in an investment material. Some already known methods can be selected for the embedding.

To obtain a negative mold of the model, the model is removed from the investment material. The model is preferably melted or burned out without residue by an elevated temperature. The melted material or the combustion products of the material can, for example, flow off or escape through a suitable channel.

The raw material is subsequently inserted into the negative mold to produce the dental component. It is particularly advantageous if the aforementioned channel is used in this respect to remove the model material.

The dental component is produced in the negative mold and is present therein after the curing of the raw material. To expose the dental component, the negative mold is subsequently removed.

Advantageous embodiments of the invention are also set forth in the claims, in the following description, and in the Figures.

In accordance with an embodiment, at least a portion of data required for the preparation of the virtual model is acquired by intraorally scanning a dentition of a patient or a part thereof.

At least a portion of data required for the preparation of the virtual model is preferably acquired by scanning a negative impression of a dentition of a patient or a part thereof. It is also possible to produce a positive model on the basis of the negative impression, with the positive model then being scanned.

Provision can be made that at least a portion of data required for the preparation of the virtual model is taken from a database.

The virtual data of the dentition of the patient make it possible to virtually plan the component to be produced, e.g. by means of a suitable computer program. The result of this planning is then a virtual model of the dental component to be produced or of a structure that includes this dental component. It preferably also contains data on the type and/or on the properties of the raw material from which the component is to be produced.

In accordance with a further embodiment, the model is connected to at least one base body that is in particular produced from the model material and that forms a channel in the negative mold, in which channel a pressing tool, in particular a punch for a pressing process, can be guided and/or through which channel the raw material can be fed to the negative mold. The channel can also serve for the removal of the model material.

Due to a suitable design of the channel, for example as a straight-line channel with a circular cross-section, the pressing tool (e.g. a cylindrical punch) can be moved in a guided manner.

Furthermore, the feeding of the raw material is simplified by the channel. The raw material can thereby not only be introduced in a liquid or powdered state; it is likewise possible for the raw material to be present in pellet form, for example. The diameter or the dimensions of the raw material pellets can be adapted to the size or the diameter of the channel. For example, the diameters of the pellets used, of the channel, and of the pressing punch are substantially the same to enable the best possible pressing force transmission. Ideally, the pellets were each adapted to the raw material requirements of the dental component to be produced.

The base body is preferably produced from the model material. Due to the same material properties resulting from the material selection, the base body can be removed from the investment material together, in particular simultaneously, with the model. Accordingly, the parameters for, for example, a burnout do not have to be additionally adapted to the base body since they correspond to the parameters for the removal of the model.

Provision can furthermore be made that the base body and—if present—a connection passage connecting the base body and the model are integrally produced with the model by means of the additive manufacturing process.

Due to the integral production, the work step of attaching the model to the base body can be saved. The connection passage is ultimately a kind of web for the model that forms a passage in the negative mold.

In accordance with a further embodiment of the method, provision can be made that a base plate for receiving the model and/or—if present—the base body is integrally produced with the model and/or with the base body by means of the additive manufacturing process. It is also conceivable that least one section of an embedding housing part provided for embedding the model (e.g. a kind of hollow cylindrical sleeve) is integrally produced with a base plate—with or without a model and/or base body—by means of an additive manufacturing process. For example, it is possible to manufacture the model and/or the base body separately from an integrally produced base plate/embedding housing combination. In accordance with an embodiment variant, all the components—that is the model, the base body (if present), the base plate, and the embedding housing part—are integrally produced together. Another variant provides that only the base body, the embedding housing, and the base body are produced together. In this case, the model is additively manufactured separately, for example, by means of a particularly precise 3D printer that is not required for the manufacture of the other components. The model is then fastened to the base body or the base plate in the predetermined position. To simplify the positioning, orientation marks can be provided at the separately manufactured components, e.g. in that they are also produced during the additive manufacturing.

Provision can also be made that the model is fastened to the base body before the embedding, in particular with the aid of the model material, preferably while forming a connection passage connecting the base body and the model.

In accordance with a further, particularly efficient embodiment of the method, a plurality of models of a plurality of dental components are additively manufactured together.

If provision is made to print a plurality of models at the same time, they can be arranged in the virtual model such that an optimized and efficient additive manufacturing of all the models together is possible. This optimized arrangement can be automatically calculated on the basis of the virtual models.

The models are subsequently jointly embedded in the investment material, with their spatial arrangement in the investment material also being automatically planned and/or suggested on the basis of the virtual models of the dental components.

In accordance with a further embodiment, the negative mold is removed by means of at least one stripping manufacturing process.

The stripping manufacturing process preferably comprises compressed air blasting, and/or water blasting, and/or milling.

In accordance with a further embodiment, the dental component is at least party manually released from the negative mold.

In this respect, it is particularly preferred if a portion of the investment material is removed that is the furthest away from the dental component produced. After the manual removal of a portion of the investment material, the remaining investment material is removed in an automated manner. It is self-explanatory that the manual removal and the automated removal can also be swapped so that the portion of the investment material removed from the dental component produced is first removed in an automated manner and the dental component is then manually deflasked.

The dental component is preferably removed from the negative mold in an at least partly automated manner.

The automated release can in particular be made possible by an automated stripping manufacturing process. The stripping manufacturing process can be designed such that a removal speed is adapted to the position of the produced dental component within the investment material. For example, the further away the dental component is from the current removal position, the higher the removal speed is selected. The removal speed decreases accordingly in the vicinity of the dental component. A gentle and nevertheless efficient deflasking of the dental component is hereby made possible. The type and/or the properties of the investment material can be taken into account on the deflasking, in particular automatically.

To accelerate the deflasking, a total segment of the investment material, with respect to which it is known based on the virtual model that no dental component is included therein, can be cut off.

Provision can furthermore be made that the model material is a material that is combustible without residue, in particular a plastic, and/or that the model material is a light-curing plastic.

The model material can have a melting point, a boiling point, or a sublimation point in a range from above room temperature to 900° C.

Provision can be made that the investment material comprises gypsum and/or a gypsum-like material and/or is phosphate-bonded and/or ethyl silicate-bonded.

In accordance with a further embodiment, the production of the dental component takes place on the application of a pressing force, in particular on the application of a pressing force of 10 N to 1000 N, and/or takes place in a temperature range from 100° C. to 1200° C. A firing of the dental component under a constant or time-variable application of pressing force provides particularly good results, among other things, also because a complete and uniform filling of the negative mold by the raw material is thereby achieved, on the one hand. On the other hand, the formation of pores within the dental component is kept as low as possible.

A system in accordance with the invention for manufacturing a dental component, in particular a dental prosthesis or a partial dental prosthesis, comprises a model manufacturing apparatus for the additive manufacturing of a model on the basis of a virtual model; and a control device, in particular with the model manufacturing apparatus being connectable or connected to the control device to receive control data from the control device. The model manufacturing apparatus is, for example, a 3D printer that works in accordance with the principle of stereolithography, in particular laser microstereolithography.

Alternatively, the control data can also be generated automatically in the model manufacturing apparatus on the basis of the data of the virtual model, supported by the operator if required (semi-automatic control data generation, e.g. the control device suggests a control data program that is manually adapted if required).

In accordance with a possible embodiment of the system, the system additionally comprises a programmable dental furnace, with the programmable dental furnace being connectable or connected to the control device, in particular with the control device being configured and adapted to automatically select a program for operating the dental furnace and/or to automatically prepare such a program and/or to automatically suggest such a program on the basis of the virtual model of the dental component, in particular with the control device being configured and adapted to directly or indirectly control the dental furnace.

A program that controls and/or regulates the operation of the furnace is prepared or selected automatically—i.e. without an intervention by an operator—on the basis of the virtual model. The program can be used directly or it is suggested to the operator who must authorize the use of the program. It is also conceivable that the program suggested can be modified by the operator before it is started. The type and/or the properties of the raw material used can be taken into account when selecting and/or preparing the program, in particular automatically.

Since the virtual model is known, the volume and/or the geometry of the dental component and/or other characteristic parameters of the dental component can be taken into account when selecting or preparing the program controlling/regulating the furnace to ensure ideal firing results and also to take economic aspects into account at the same time. A taking into account of the properties of the dental component to be produced, for example, makes it possible to generate or select a firing program that lasts as long as necessary, but as short as possible.

The data of the virtual model are used to select a suitable program from a program library stored in the furnace or from a program library stored in an external database. It is likewise possible that a program taken from a library is adapted or modified while taking into account the virtual model or that an individual program is created on the basis of the virtual model. For example, characteristic parameters of the virtual model are fed into suitable algorithms for this purpose. A suitable program, for example, comprises at least one constant or time-variable operating parameter, in particular a plurality of constant or time-variable operating parameters, of the furnace and/or functions of the operating parameter or parameters in dependence on the time.

The dental furnace preferably has a pressing device by means of which the raw material can be inserted into the negative mold on the application of a pressing force and/or by means of which the dental component can be produced on the application of a pressing force. In principle, the total firing process or at least parts thereof can take place on the application of a pressing force.

In accordance with a possible embodiment of the system, the system additionally comprises a raw data acquisition device, in particular an optical scanner, for intraorally scanning a dentition of a patient or a part thereof and/or for scanning a negative impression of a dentition of a patient or a part thereof and/or for scanning a physical model of the dental component.

In accordance with a further embodiment of the system, the control device is configured and adapted to receive the virtual model and/or to prepare the virtual model on the basis of data of at least one scan.

In accordance with a further embodiment of the system, the system additionally comprises a programmable furnace for removing the model from the investment material, with the furnace being connectable or connected to the control device to receive control data from the control device, in particular with the control device being configured and adapted to automatically select at least one process parameter for operating the furnace and/or to automatically prepare such a process parameter and/or to automatically suggest such a process parameter on the basis of a virtual model of the dental component. The type and/or the properties of the model material used can be taken into account when selecting and/or preparing the parameter, in particular automatically.

In accordance with a further embodiment, the system additionally comprises a deflasking device for an at least partly automated removal of the dental component from the negative mold on the basis of a virtual model, with the deflasking device being connectable or connected to the control device to receive control data from the control device, in particular with the deflasking device working by means of a stripping manufacturing process such as compressed air blasting, and/or water blasting, and/or milling.

In accordance with yet a further embodiment, the scanning apparatus and/or the model manufacturing apparatus and/or the programmable furnace and/or the dental furnace and/or the deflasking device has/have a control unit that is separate from the control device and that is connectable and/or connected to the control device, in particular with the control device providing a higher-ranking control.

Figure 2:
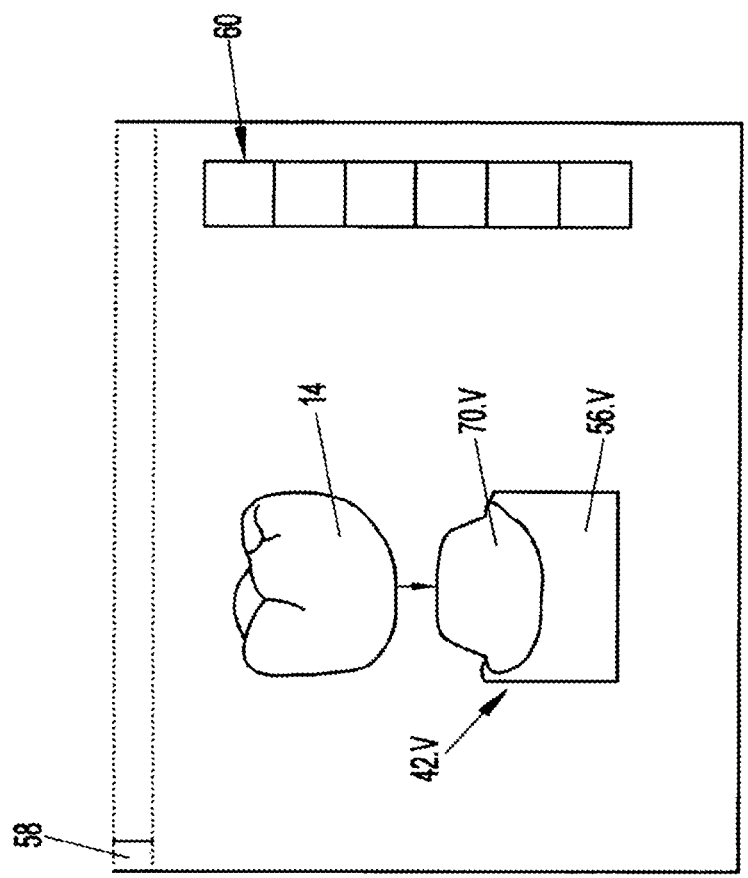
Figure 3:
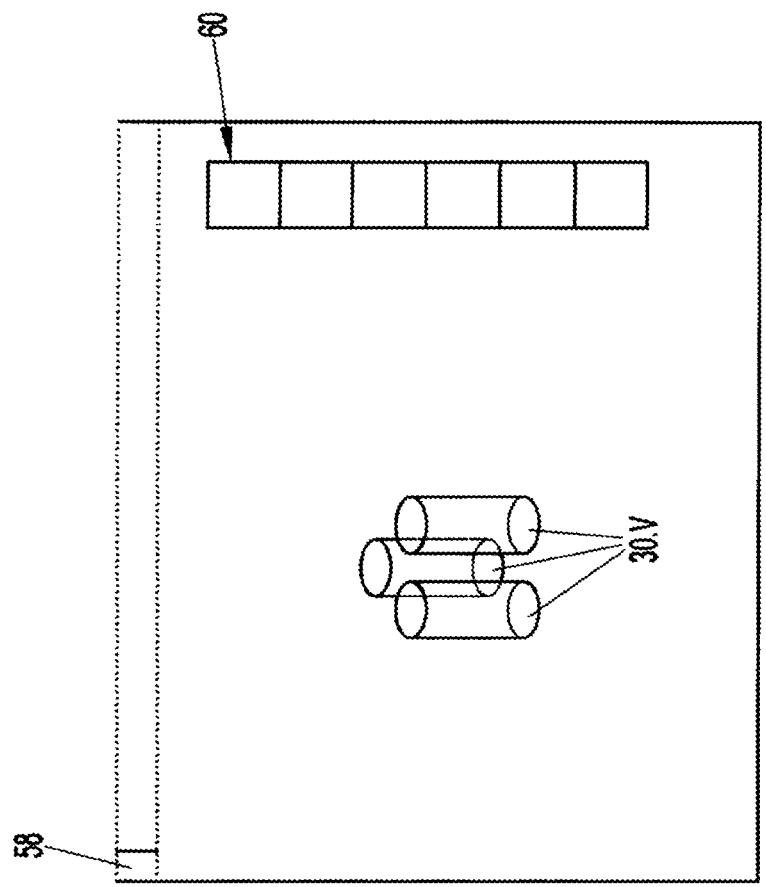
Figure 4:
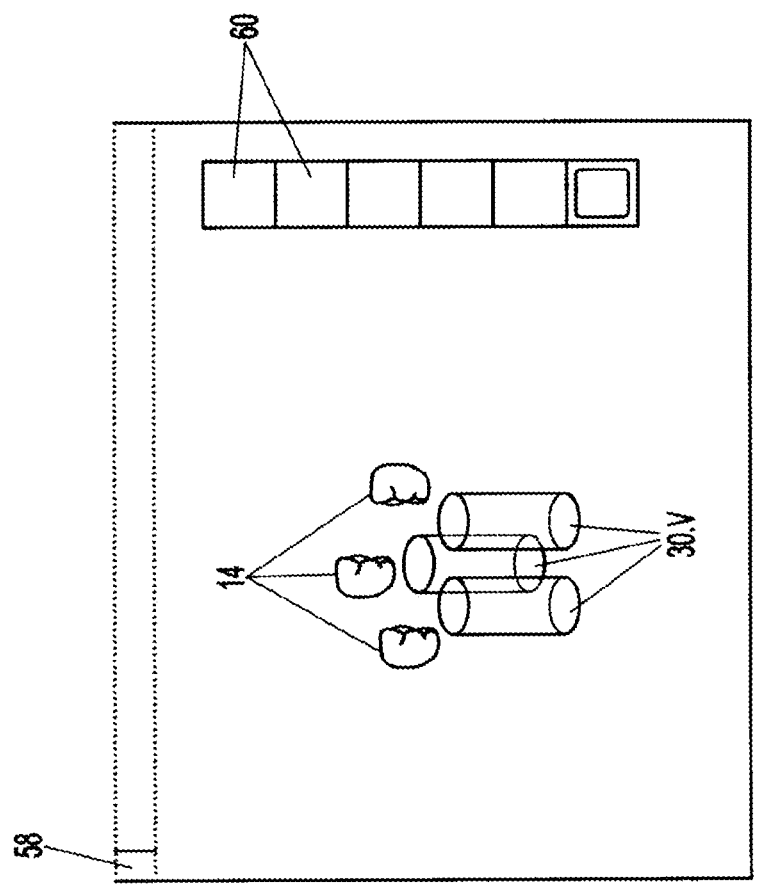
Figure 5:
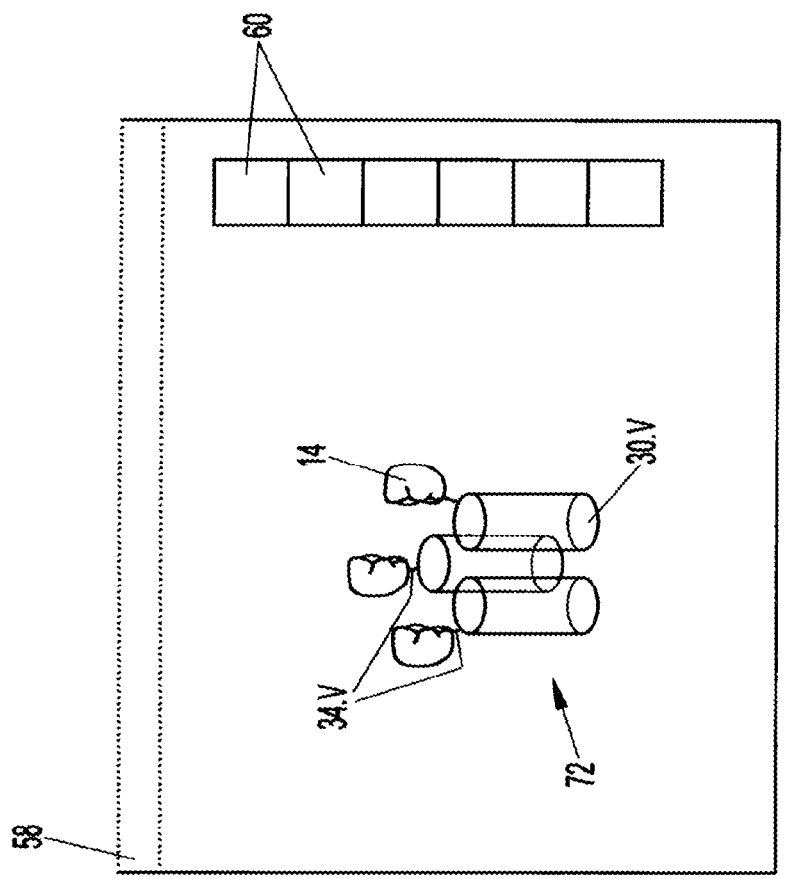
Figure 6:
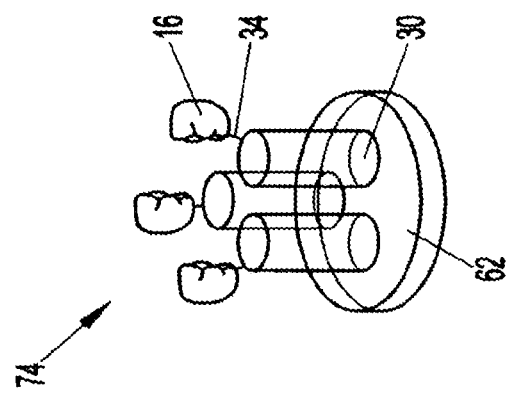
Figure 7:
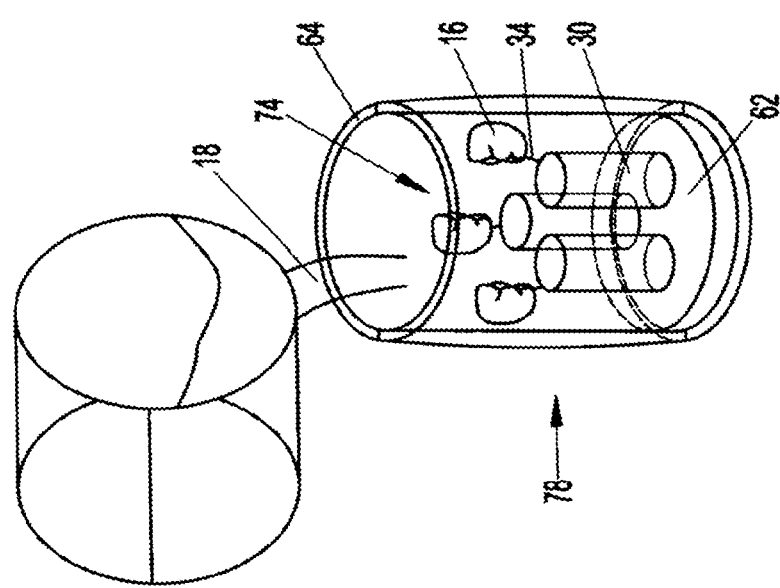
Figure 8:
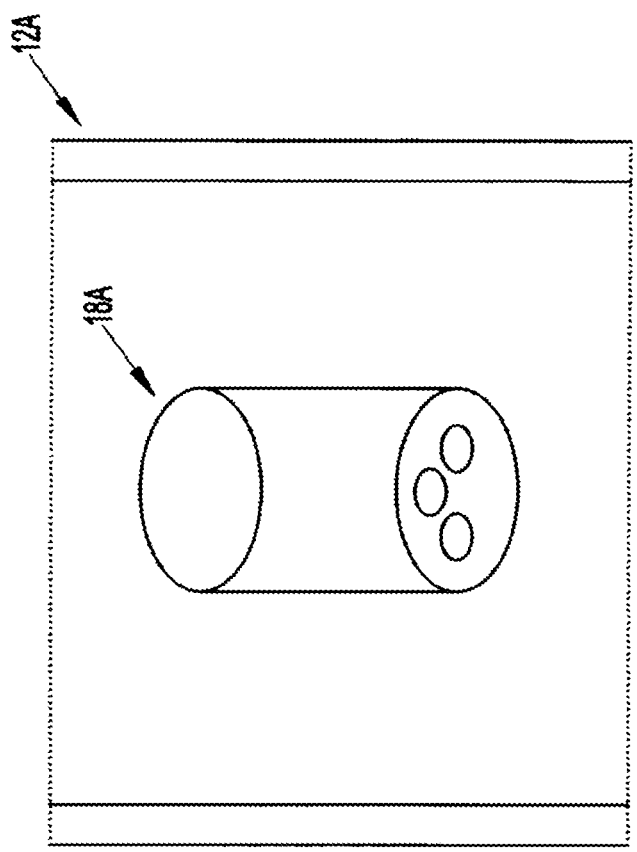
Figure 9:
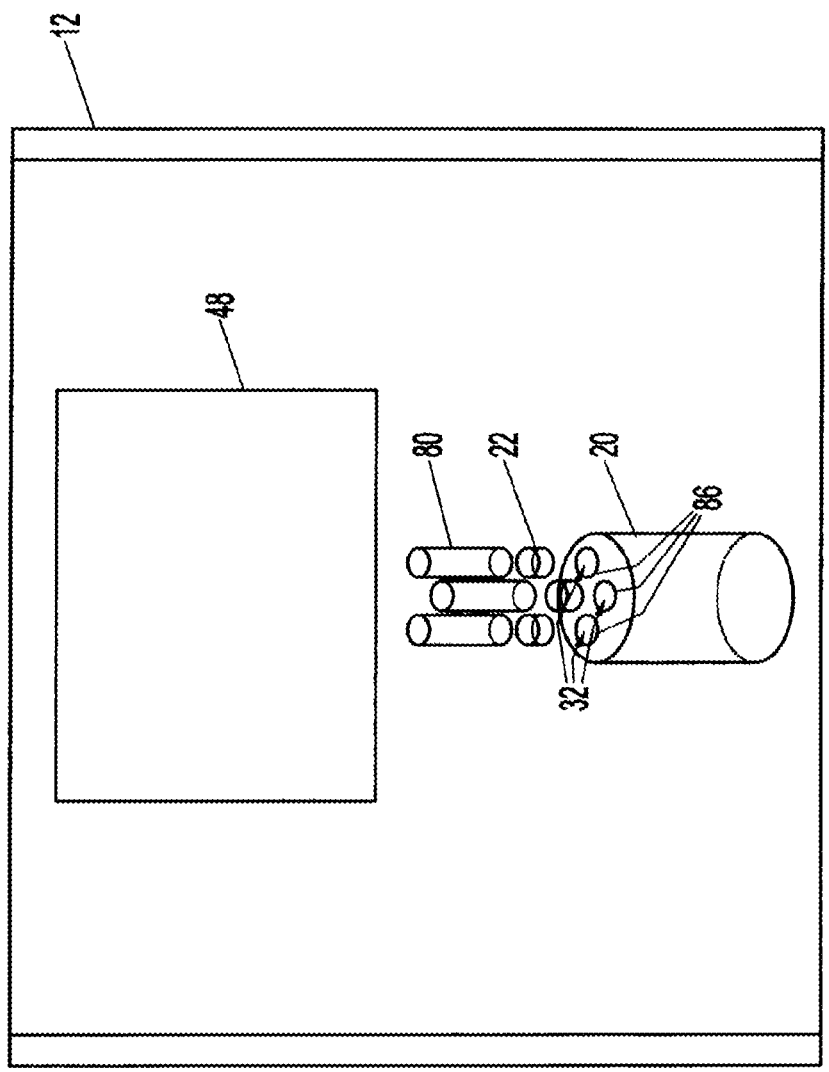
Figure 10:
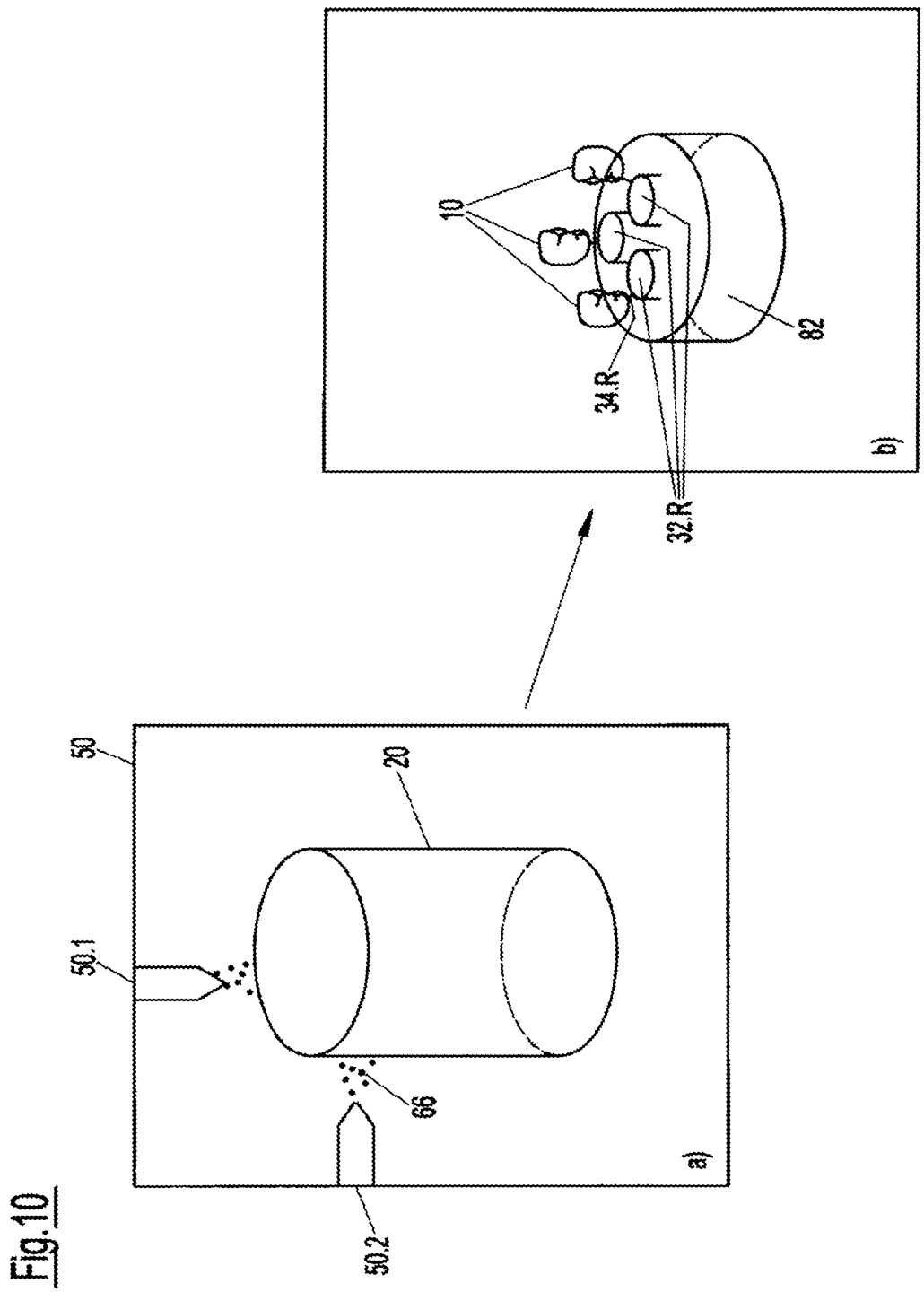
Figure 11:
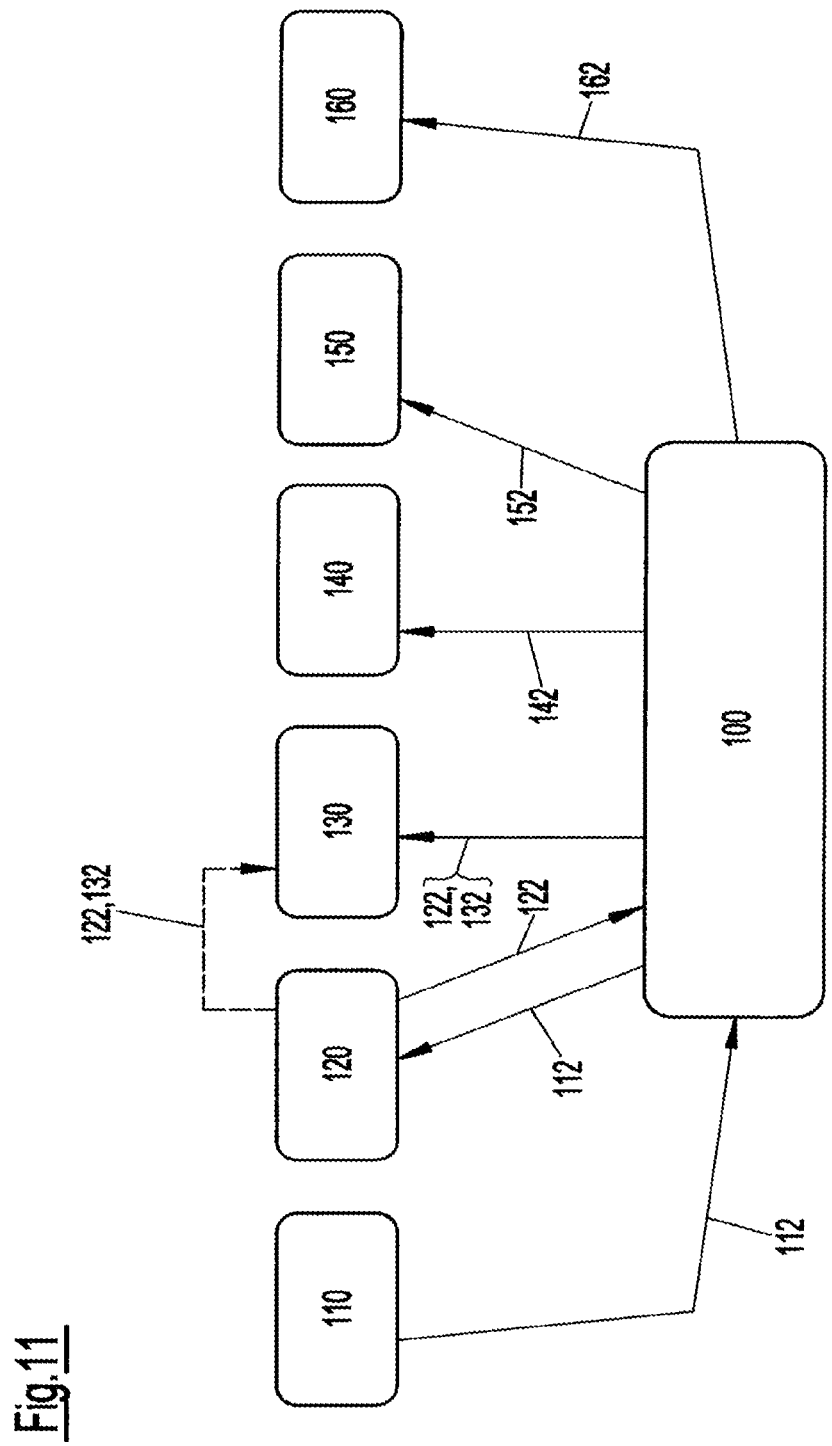

The method in accordance with the invention and the system in accordance with the invention will be described purely by way of example in the following with respect to an advantageous embodiment and to the Figures enclosed. There are shown:

FIG. 1 an intraoral scanning of a dentition of a patient;

FIG. 2 a preparation of a virtual model of a dental component adapted to the dentition of the patient with the aid of a computer-based program;

FIG. 3 a positioning of virtual base bodies with the aid of the program;

FIG. 4 a positioning of the virtual models on the virtual base bodies with the aid of the program;

FIG. 5 a production of a virtual structure on the basis of the virtual models with the aid of the program;

FIG. 6 a physical structure that was produced on the basis of the virtual structure;

FIG. 7 an embedding of the physical structure in an investment material to produce an embedded body;

FIG. 8 a burning out of the physical structure from the embedded body to produce a negative mold;

FIG. 9 an insertion of a raw material required for the production of the dental components and of pressing punches into the negative mold;

FIG. 10 a deflasking of the dental component with the aid of a deflasking device; and FIG. 11 an embodiment of the system in accordance with the invention.

FIGS. 1 to 10 show the individual steps of an embodiment of the method in accordance with the invention.

A first step of the method in accordance with the invention is shown schematically in FIG. 1. A part of a dentition 42 of a patient is scanned intraorally (indicated by the reference numeral 26) with the aid of a scanning apparatus 40. The part of the dentition 42 has the gums 56 of the dentition, two defect-free teeth 68, and a defective tooth 70 requiring a partial dental prosthesis. It is generally also conceivable that a (negative) impression of the dentition 42 is produced. This impression can then be scanned. However, it is also possible by means of the impression to produce a (positive) physical model of the dentition 42 that is then scanned.

The scan data form the basis for a virtual model 42.V of the scanned part of the dentition 42 (see FIG. 2).

FIGS. 2 to 5 show a graphical user interface 58 of a computer-based program for virtually processing the virtual model 42.V, wherein the graphical user interface 58 has a toolbar 60 by means of which different tools can be selected for preparing and processing a virtual model 14 of a dental component provided for the reconstruction of the defective tooth 70.

In FIG. 2, the virtual model 14 of this partial dental prosthesis is shown that is adapted to the previously prepared virtual dentition 42.V. The virtual dentition 42.V comprises virtual gums 56.V and a virtual, defective tooth 70.V. For example, the virtual dentition 42.V is based on the previously performed intraoral scan 26. With the aid of the computer-based program, the virtual model 14 can be adapted for the defective tooth 70 such that the dentition 42 of the patient can be repaired using a dental component 10 based on the virtual model 14. For example, the virtual model 14 can be automatically or manually taken from a database comprising a plurality of standard models. If necessary, the selected standard model can be adapted to the respective present situation to create a virtual model 14 that is optimized from the point of view of dental technology. In other words: The adaptation can take place automatically, semi-automatically (e.g. a manual adaptation of a basic model or of a standard model), or manually.

In principle, the preparation of a physical model of the virtual model 14 can now be started. However, a plurality of physical models are frequently produced at the same time for the simultaneous manufacture of a plurality of dental components for different patients in order to save costs.

For the embedding of the physical model still described in the following, it is advantageous if it is arranged on a kind of base or on a base body. This can also be planned with the aid of the program. The program can e.g. automatically determine how a plurality of physical models are spatially arranged as advantageously as possible to be able to simultaneously manufacture as many dental components as possible with one process run (this planning can also take place manually or with manual support). For this purpose, a plurality of base bodies are necessary under certain circumstances. In the present example, the program suggests an arrangement of three base bodies (virtual base bodies 30.V) (see FIG. 3). The arrangement of the base bodies 30.V can also be predefined by apparatus framework conditions, e.g. by a configuration of the furnace and/or by a design of a pressing apparatus of the furnace. The virtual base bodies 30.V can be connected to one another by virtual webs (not shown).

In the next step shown in FIG. 4, three virtual models 14 are arranged above the three virtual base bodies 30.V such that the virtual models are indeed disposed close to the virtual base bodies 30.V, but there are still no points of contact.

FIG. 5 represents a planning step in which virtual connection webs 34.V are inserted (automatically, manually, or partly manually) between the virtual base bodies 30.V and the virtual models 14. The connection webs 34.V connect the virtual base bodies 30.V to the virtual models 14. Thus, a virtual structure 72 was created by means of which a physical structure can be produced that forms the basis for preparing a suitable negative mold.

It is understood that the virtual production and processing of the structure 72 can generally take place automatically. However, there is preferably the possibility that an operator can make adjustments as required in all the planning steps.

FIG. 6 shows a physical structure 74 that was produced on the basis of the structure 72 virtually designed in FIGS. 2 to 5. The structure 74 has three physical models 16 that are each a physical copy of the corresponding virtual model 14 and that are each connected to a respective at least one base body 30 via at least one connection web 34. Connection webs can generally also be provided between the models 16 and the base bodies 30. They can subsequently be manually inserted or can already be taken into account in the virtual planning.

The structure 74 can be manufactured on the basis of the previously prepared virtual structure 72 by means of an additive manufacturing process, in particular by means of 3D printing. However, it is also possible to manufacture the structure 74 or individual parts thereof in a different manner—in particular by a stripping process, for example by means of milling—and/or to rework the structure 74, in particular manually.

On a production of the structure 74 by means of 3D printing, it is advantageous if all three basic components—models 16, base body 30, and connection webs 34—are produced from the same model material (e.g. a wax-like material and/or plastic). If the three components were only partly produced together or were even produced in individual steps using different methods, the three components thus preferably likewise have the same or at least a similar material. The materials used preferably have a similar melting behavior. The model material is in particular combustible without residue. The material preferably has a melting point, a boiling point, or a sublimation point in a range from above room temperature to 900° C.

A particularly suitable 3D printing process is, for example, stereolithography, in which a light-curing plastic is used.

The structure 74 produced is positioned in a well-defined position and alignment on a base plate 62 and is preferably fixed there. It can also be manufactured (e.g. printed) directly on the base plate 62. It is also possible for the base plate 62 to likewise be printed. For example, the plate and the structure 74 are printed together.

As is shown in FIG. 7, a sleeve 64 is placed onto the base plate 62 so that it surrounds the structure 74 and is, for example, fastened to the plate 62 by means of a plug-in connection. The sleeve 64 forms a cup-like cylinder 78, which is open at one side, with the base plate 62. A suitable investment material 18 is now inserted into the inner space of the cylinder 78. It can also be printed together with the base plate 62, whereby the process is simplified further. The investment material 18 can be a gypsum-like material and/or phosphate-bonded and/or ethyl silicate-bonded.

After the curing of the investment material 18, the sleeve 64 and the base plate 62 are removed. This can in particular be promoted in that the inner sides of the sleeve 64 and of the base plate 62 are wetted with a separation means prior to the assembly and/or have a corresponding surface coating.

FIG. 8 shows a further step in the production of a dental component. The cured investment material 18 forms an embedded body 18A that is now inserted into a programmable burnout furnace 12A. The embedded body 18A is positioned such that the end face 84 of the cylindrical, cured investment material 18 formed by the base plate 62 faces downwardly.

The process parameters for operating the burnout furnace 12A can be selected automatically, manually, or partly manually on the basis of the virtual model 14, the virtual components 30.V, 34.V (see FIGS. 2 to 5), and/or the total virtual structure 72. The goal is to ensure that the models 16, the connection webs 34, and the base bodies 30 are removed as efficiently and completely as possible by a burning out of the cured investment material 18. For this purpose, suitable process parameters, such as a maximum temperature, a temperature development, and/or a firing duration, are selected to melt the material of the aforementioned components and/or to burn it off without residue without damaging the embedded body. The melted material or the combustion products of the material can flow out or escape from the body 18A.

The process parameters mentioned can naturally also be taken from a database or can be based on empirical values.

A negative mold 20 of the models 16, of the connection webs 34, and of the base bodies 30 results from the process of burning out the models 16, the connection webs 34, and the base bodies 30 from the embedded body 18A. The negative mold 20 thus has channels 32 that are negative impressions of the base bodies 30.

In FIG. 9, it is schematically shown how pellets 22 of a raw material are inserted into the channels 32 of the negative mold 20. Said raw material is preferably divided into portions such that it corresponds to the amount required for the respective dental component 10. The required amount can, for example, be determined from the virtual model 14. The raw material can also be introduced as powder, pellets, or in another form. It is melted in a dental furnace 12 and is pressed into the negative impressions of the models 16 via the negative impressions of the connection webs 34 (=connection passages) on the application of a pressing force to ensure a complete and pore-free filling of the impressions of the models 16. Connection passages between the models 16 and/or the channels 32 facilitate the exchange of melted raw material within different regions of the negative mold 20.

The pressing force is generated by a pressing device 48 associated with the furnace 12 and is transmitted to the raw material by means of pressing punches 80. The pressing force can be generated by an active movement of the punches 80 and/or by a movement of the negative mold 20 relative to the punches 80. The pressing force can be maintained constant or variable in time until the complete curing of the dental component produced. However, it is likewise possible that the pressing force is, for example, only applied until the raw material 22 has fully penetrated into the negative mold of the models 16.

A control device is associated with the dental furnace 12 by which said dental furnace 12 can be controlled. The dental furnace 12 is preferably freely programmable. The process parameters of a firing program—e.g. pressing force and temperature—are determined on the basis of the properties of the virtual model 16 and/or of the virtual structure 72. The type and/or the properties of the raw material used can in this respect be taken into account. It is e.g. possible for the operator to input this information manually and/or to obtain it from a database and to integrate it into the virtual model when planning the latter. The virtual model then therefore not only includes geometric information, but also information that characterizes the material. Based on, for example, the design of the dental components to be produced, the required amount of raw material 22 and the spatial position, the volume and/or the geometry of the negative impressions of the models 16 in the negative mold 20 (the number and position of the base bodies 30 can also be taken into account), a firing program can be automatically suggested by the control device, said firing program being defined by suitable process parameters that can also be a function of time if required. For example, the firing program is calculated or produced (in part) from suitable parameters of the present virtual models 16 or of the virtual structure 72. It is also possible that the firing program is (partly) taken from a program library, wherein parameters of the present virtual models 16 or of the virtual structure 72 are taken into account when selecting the suitable firing program. The suggested and/or produced firing program can be modified by an operator as required. A purely manual definition of the firing program is also conceivable in principle.

After the curing and cooling of the raw material in the negative mold 20, the investment material 18 is removed. This can take place manually. However, it is more efficient to at least partly automate the deflasking.

For this purpose, a deflasking device 50 is provided (see FIG. 10a) that removes the material 18 by means of compressed air blasting using a solid blasting means (see nozzles 50.1, 50.2) or by means of water blasting. Other stripping processes such as milling and/or combinations of different processes can also be used.

The position of the produced dental components in the mold 20 is known based on the data of the virtual structure 72 and due to the well-defined fixing of the physical structure 74 on the base plate 62. If the mold 20 is now positioned in a known alignment and position in the deflasking device 50, said data can serve as a basis for a control of the deflasking device 50. Said deflasking device 50 is controlled such that the material 18 is efficiently removed without damaging the components. An intervention by an operator nevertheless remains possible, should it be necessary. Provision can also be made that only a rough removal of the material 18 is performed in an automated matter and the final deflasking takes place manually. Larger regions of the body 18A in which no components are included can also be detached, in particular cut off, as whole pieces in a manual, semi-automated, or automated manner.

The type and/or the properties of the investment material 18 can be taken into account in the automated or semi-automated deflasking. For example, corresponding information is input manually or is taken from a database.

Markings and/or mechanical codings can be provided to facilitate the positionally accurate and reproducible positioning of the structure 74 on the base plate 62 (or on a comparable base unit) and/or of the mold 20 in the device 50.

FIG. 10b shows the result of the deflasking. The dental components 10 produced by means of the mold 20 are also connected to the raw material (webs 34.R) that is cured in the passages produced by the webs 34 and that is in turn connected to raw material cured in the channels 32 (see reference letter 32.R). The components 10, 34.R, and 32.R are an at least partial copy of the physical structure 74 (the base bodies 30 are generally not completely reproduced) that is anchored in a base 82 (remainder of the negative mold 20). The dental components 10 can now be detached and reworked as required.

FIG. 11 schematically shows a system in accordance with the invention. The raw data 112 acquired by a raw data acquisition device 110 (e.g. a scanner 40, see FIG. 1) are fed to a control 100 that can be a control and regulation device. It forwards the raw data 112 to a model planning module 120 that is, for example, a program module that is integrated into the control 100 or that runs on a separate processing unit.

A virtual model of the required dental component and/or of a structure including the component is—automatically, semi-automatically, or manually—generated on the basis of the raw data 112 with the aid of the model creation module 120 (see e.g. FIGS. 2 to 5). Corresponding model data 122 are transmitted via the control 100 or directly (see dashed arrow) to a model manufacturing device 130 (e.g. a 3D printer), where a physical model or a physical structure of the virtual model or of the virtual structure is produced (see e.g. FIG. 6). It is also possible that the model data 122 are first converted into operating parameters 132 and/or into a corresponding operating program for the device 130. The parameters or the program 132 can be input by an operator at the device 130 or at the control 100. However, the corresponding parameters or the corresponding program 132 are preferably automatically produced or selected on the basis of the model data 122 and—if necessary—modified by the operator as required.

After the embedding of the physical model or of the physical structure, the embedded body obtained is burned out in a programmable furnace 140 (e.g. a burnout furnace 12A, FIG. 8). The operating parameters 142 required for this purpose and/or a corresponding operating program can be input by an operator at the furnace 140 or at the control 100. However, the corresponding parameters or the corresponding program 142 are preferably automatically produced or selected on the basis of the model data 122 (wherein the type and/or the properties of the model material is/are preferably also taken into account) and—if necessary—modified by the operator as required.

The burnout process provides a negative mold of the physical model or physical structure. The mold is filled with the material of the dental component (see e.g. FIG. 9) and is fired in a programmable dental furnace (e.g. furnace 12)—optionally with a pressing device. The operating parameters 152 required for this purpose and/or a corresponding operating program can be input by an operator at the furnace 150 or at the control 100. However, the corresponding parameters or the corresponding program 162 are preferably automatically produced or selected on the basis of the model data 122 (wherein the type and/or the properties of the raw material is/are preferably also taken into account) and—if necessary—modified by the operator as required.

The component produced in the negative mold now has to be removed from the investment material. For this purpose, a deflasking apparatus 160 is provided (see e.g. the deflasking device 50, FIG. 10). The deflasking can generally take place manually. However, this step is preferably also performed in a completely automated manner or in an at least partly automated manner (e.g. "rough" deflasking in an automated manner, concluding "final deflasking" in a manual manner). The operating parameters 162 required for this purpose and/or a corresponding operating program can be input by an operator at the apparatus 160 or at the control 100. However, the corresponding parameters or the corresponding program 162 are preferably automatically produced or selected on the basis of the model data 122 (wherein the type and/or the properties of the raw material is/are preferably also taken into account) and—if necessary—modified by the operator as required.

A single control 100 was shown by way of example. However, it is also conceivable to provide two or more control units that each control and/or regulate parts of the process or one or more of the functional units 110, 120, 130, 140, 150, 160 described above. The control units can also be connected between a higher-ranking control and the functional units. The data exchange between the control or the control unit(s) and the functional units and/or among the control units themselves and/or among the functional units themselves (shown by way of example at the units 120, 130; if required, the other or some of the other units can also be connected to one another) preferably takes place via a network, e.g. via the Internet and/or via a local network (in a wireless and/or wired manner). Parts of the system can thus be arranged spatially separated from one another to make ideal use of resources.

Any necessary data format conversions or modifications of the data, e.g. a conversion of visualization data records into CAD data records or similar, can be performed at any desired point in the system. The same applies to the automatic or semi-automatic production and/or selection of the model parameters or model data or operating parameters or operating data 122, 132, 142, 152, 162.

The system in accordance with the invention or the corresponding method is based on a use of virtual data that is as efficient as possible to control different apparatus that are required to produce a dental component. Interventions by an operator are minimized, which is accompanied by cost advantages. The linking of the components of the system allows the spatial separation of individual process steps to be able to exploit specific location advantages in each case. For example, the planning of the dental component, that is the virtual preparation of the actual manufacturing steps, can take place at a different location than the actual manufacturing steps.

REFERENCE NUMERAL LIST 10 dental component
12 dental furnace
12A burnout furnace
14 virtual model
16 physical model
18 investment material
18A embedded body
20 negative mold
22 raw material pellet
26 intraoral scanning
30 physical base body
30.V virtual base body
32 channel
32.R cured raw material in the channel 32
34 physical connection web
34.R web composed of cured raw material
34.V virtual connection web
40 scanning apparatus
42 physical dentition
42.V virtual dentition
48 pressing device
50 deflasking device
50.1, 50.2 nozzle
56 physical gums
56.V virtual gums
58 graphical user interface
60 toolbar
62 base plate
64 sleeve
68 healthy tooth
70 damaged tooth
70.V virtual damaged tooth
72 virtual structure
74 physical structure
78 cylinder
80 pressing punch
82 base
110 raw data acquisition device
112 raw data
120 model planning module
122 model data
130 model manufacturing device
140, 150 programmable furnace
132, 142, 152, 162 operating parameters, operating program
160 deflasking apparatus

What is claimed is:

1. A method of manufacturing a dental component, the method comprising the following steps:
   (i) additively manufacturing a physical structure including a model of the dental component from a model material on the basis of a virtual model of the dental component, the physical structure including a base body integrally connected to the model via a connection passage;
   (ii) embedding the physical structure in an investment material;
   (iii) removing the physical structure from the investment material to obtain a negative mold of the model, the connection passage, and the base body;
   (iv) inserting a raw material for manufacturing the dental component into the negative mold;
   (v) producing the dental component from the raw material in the negative mold; and
   (vi) removing the negative mold from the dental component;
   wherein the physical structure is positioned on a base plate integrally produced with the physical structure by means of the additive manufacturing process; and
   wherein at least one section of an embedding housing part provided for embedding the physical structure in the investment material is integrally produced with the base plate by means of the additive manufacturing process.

2. The method in accordance with claim 1, wherein at least a portion of data for the basis of the virtual model is acquired by intraorally scanning a dentition of a patient or a part thereof.

3. The method in accordance with claim 1, wherein at least a portion of data for the basis of the virtual model is acquired by scanning a negative impression of a dentition of a patient or a part thereof or a model produced on the basis of the negative impression.

4. The method in accordance with claim 1, wherein at least a portion of data for the basis of the virtual model is taken from a database.

5. The method in accordance with claim 1, wherein the base body forms a channel in the negative mold, in which channel a pressing tool can be guided and/or through which channel the raw material can be fed to the negative mold during the producing of the dental component.

6. The method in accordance with claim 5, wherein the base body is produced from the model material.

7. The method in accordance with claim 1, wherein the dental component includes a plurality of dental components, the model includes a plurality of models each of a respective one of the plurality of dental components, the base body includes a plurality of base bodies, and the connection passage includes a plurality of connection passages, and wherein said step of additively manufacturing the physical structure includes additively manufacturing the physical structure including the plurality of models of the plurality of dental components and the plurality of base bodies each integrally connected to a respective one of the plurality of models via a respective one of the plurality of connection passages.

8. The method in accordance with claim 1, wherein the negative mold is removed from the dental component by means of at least one stripping manufacturing process.

9. The method in accordance with claim 8, wherein the at least one stripping manufacturing process comprises at least one of compressed air blasting, water blasting, and milling.

10. The method in accordance with claim 1, wherein the negative mold is removed from the dental component by at least partly manually releasing the dental component from the negative mold.

11. The method in accordance with claim 1, wherein the negative mold is removed from the dental component in an at least partly automated manner.

12. The method in accordance with claim 1, wherein the model material is a material combustible without residue and/or a light-curing plastic.

13. The method in accordance with claim 1, wherein the investment material comprises at least one of gypsum, a gypsum-like material, and/or a phosphate-bonded and/or ethyl silicate-bonded material.

14. The method in accordance with claim 1, wherein the insertion of the raw material into the negative mold takes place on the application of a pressing force, and/or in a temperature range from 100° C. to 1200° C.

\* \* \* \* \*